United States Patent [19]

Liu

[11] Patent Number: 6,134,600
[45] Date of Patent: *Oct. 17, 2000

[54] METHOD AND APPARATUS FOR DYNAMIC DERIVATIVES DESKTOPS

[75] Inventor: James Chien-chih Liu, Sunnyvale, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/674,200

[22] Filed: Jul. 1, 1996

[51] Int. Cl.⁷ ....................................... G06F 9/46
[52] U.S. Cl. ............................... 709/316; 705/36
[58] Field of Search ............... 395/680; 705/35, 705/36, 37; 709/300–305, 100–108

[56] References Cited

U.S. PATENT DOCUMENTS

| | | | |
|---|---|---|---|
| 5,038,284 | 8/1991 | Kramer | 705/37 |
| 5,706,442 | 1/1998 | Anderson et al. | 395/227 |
| 5,706,502 | 1/1998 | Foley et al. | 707/10 |
| 5,729,594 | 3/1998 | Klingman | 379/93.12 |
| 5,765,205 | 6/1998 | Breslau et al. | 711/203 |
| 5,815,657 | 9/1998 | Williams et al. | 395/186 |
| 5,963,924 | 10/1999 | Williams et al. | 705/40 |
| 5,970,479 | 10/1999 | Shepherd | 705/37 |

OTHER PUBLICATIONS (No author) "First Alert 3.0", Technical Analysis of Stocks & Commodities, (advertisement), p. 80, Oct. 1995.

Flanagan, David, "Java in a Nutshell," O'Reilly & Associates, pp. 6–8, 85, 86, 108, 109, 145–147, 197–200, 1996.

Au, Edith et al., "Chapter 13—The Future of Java", Java Programming Basics, Pencom Web Works, pp(9), 1996.

Henry, Amanda Mitchell, "Novell Schedules Java Integration", LAN Times, pp(2), Jun. 1996.

*Primary Examiner*—Majid A. Banankhah
*Assistant Examiner*—St. John Courtenay, III

[57] ABSTRACT

An apparatus for dynamic derivatives desktops and methods of operating the same result in a dynamic derivatives desktop server for a CORBA (Common Object Request Broker Architecture) operating system that processes analytic requests without compromising the analytics of the analysis. The dynamic derivatives desktop server comprises an ORB (Object Request Broker) interface which receives an analytic request from the CORBA operating system. A Java applet coupled to the ORB interface having analytics which processes the analytic request to provide analytic results to the ORB interface.

24 Claims, 3 Drawing Sheets

METHOD AND APPARATUS FOR DYNAMIC DERIVATIVES DESKTOPS

BACKGROUND OF THE INVENTION

1. Field of the Invention

The present invention relates to distribution of analytical risk management software tools in a CORBA (Common Object Request Broker Architecture) environment and more particularly to enable access to the analytical risk management software tools without compromising the analytics.

2. Description of the Related Arts

As the internet becomes more and more popular, desktop trading is also becoming more and more popular. Today, the desktop traders have many risk management tools available to them. The traders use a variety of custom developed tools and spread sheets to calculate risks on portfolio positions. The analytics used to calculate these risk positions are sophisticated, especially in the area of derivatives trading.

Many private investors with large holdings are interested in obtaining these risk management tools; however, in providing these risk management tools, the financial service providers also make available the analytical formulas for the risk management tools. In almost all cases, the analytics are proprietary and the financial service providers desire to protect the secrecy of the analytics. Currently, most financial services providers supply binary code for the risk management applications that are given to the private investors. The binary code hides to some degree the analytics of the risk management tools but is still open to reverse engineering of the analytics. Other drawbacks of encoding the risk management applications include requiring on-site system administrators to install and maintain the software.

Ensuring the clients possess the latest version of the risk management tools in the fast paced trading market adds to the cost of doing business in the financial services. Particularly, in short term markets, it is difficult to deploy software to all parties in a timely fashion. As desktop trading becomes more and more popular and the number of private investors interested in obtaining the risk management tools increases, the financial service providers are forced to limit the number of available services as well as the frequency of updates they can offer.

Therefore, it is desirable to provide an apparatus and methods of operating the same which enable clients to access the risk management tools that addresses disadvantages such as security of analytics and timely software distribution of the risk management tools.

SUMMARY OF THE INVENTION

The present invention provides an apparatus for dynamic distributive desktops and methods for operating the same which result in client accessibility to the risk management tools without accessibility to the analytics of the risk management tools. The novel dynamic distributive desktop is based on encoding the analytic of the risk management tools as object-oriented Java applets. Thus, according to one aspect of the invention, a dynamic derivatives desktop server in a CORBA operating system comprises an ORB (Object Request Broker) interface which receives an analytic request from the CORBA operating system. A Java applet coupled to the ORB interface having analytics processes the analytic request to provide analytic results to the ORB interface.

According to another aspect of the invention, the analytic request includes client data for the analytics to process the analytic request. The analytics include derivatives analytics for risk management and are proprietary to financial services which provide the analytics.

According to another aspect of the invention, the dynamic derivatives desktop includes access resources which provide dynamically configurable access to the Java applet. The access resources enable access to the Java applets which reside on the dynamic derivatives desktop. The Java applets are dynamically upgradable so latest versions of the Java applets are available to process the analytic requests and provide results.

According to yet another aspect of the invention, a distributed object-oriented analytical risk management system having a CORBA (Common Object Request Broker Architecture) on a TCP/IP network with an ORB (Object Request Broker) comprises a client platform coupled to the TCP/IP network to provide a risk management request to the ORB. A risk management server having analytics which receives the risk management request from the ORB and calculates risk results in response to the risk management request.

According to another aspect of the invention, the risk management server provides the risk results to the ORB, and the client platform receives the risk results from the ORB. The risk management server includes a Java applet to provide the analytics to calculate the risk results for the client platform. The risk management request includes client data to provide inputs for the analytics of the Java applet.

An apparatus and method for operating dynamic distributive desktops are provided by encoding the analytics of the risk management tool as distributed object-oriented Java applets. Clients have access to execute risk management tools but are isolated from the analytics of the risk management tools. Clients provide the data for the particular risk analysis and receives the results. Also, by having the risk management tools reside on a server outside the control and reach of end users, the analytics are dynamically configurable and yet protectable. Thus, clients requesting risk analysis receive the latest version of the analytics.

Other aspects and advantages of the present invention can be seen upon review of the Figures, the detailed description, and the claims which follow.

DETAILED DESCRIPTION OF THE INVENTION

Figure 1:
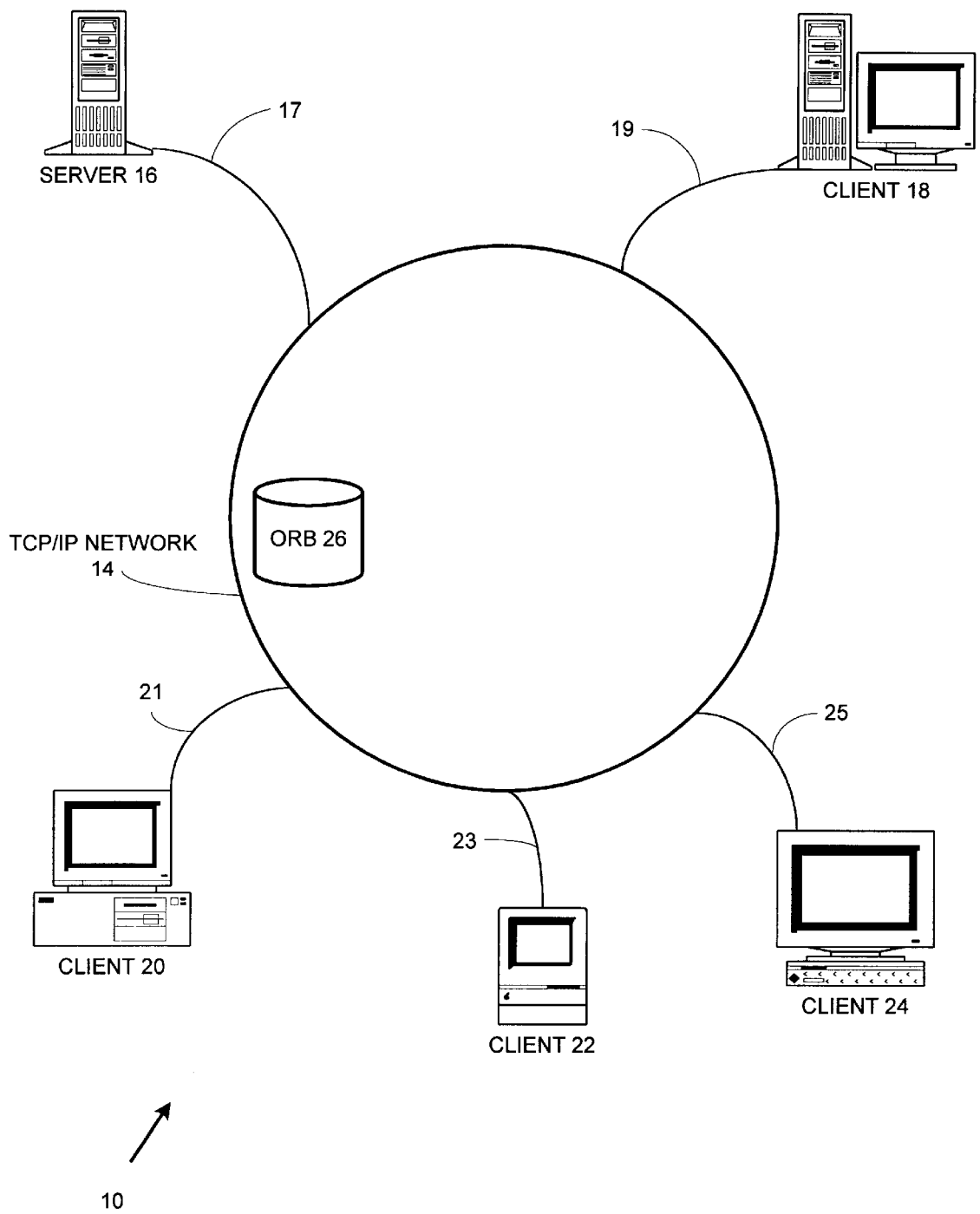
FIG. 1 illustrates a system level block diagram of a distributed object-oriented system.

The invention will be described with respect to the Figures in which FIG. 1 generally shows a distributed object-oriented system 10. The distributed object-oriented system 10 includes a TCP/IP (Transmission Control Protocol over Internet Protocol) network 14, a server 16, a client 18, a client 20, a client 22, a client 24, and an ORB (Object Request Broker) 26 which operate in a CORBA (Common Object Request Broker Architecture) environment. The TCP/IP network 14 includes other represented segments such as the Internet, intranets, and local area networks.

CORBA provides interoperability among a rapidly proliferating number of hardware and software products. Applications built in the CORBA environment are interoperable even though the applications are built in different languages, running on different machines in heterogeneous distributed environments. CORBA is designed for distributed objects and is being developed by the Object Management Group (OMG). The OMG is a consortium of software vendors and end users. CORBA provides the mechanisms by which objects transparently make requests and receive responses.

The (ORB) is the middleware that establishes the client-server relationships between objects in CORBA. Using an ORB, a client can transparently invoke an application on a server object to service the request of the client, which can be on the same machine or across a network. To accomplish this task, the ORB intercepts the call and finds an object that can implement the request, passes it the parameters, invokes the object to process the request, and returns the results. The client does not have to be aware of where the object is located, its programming language, its operating system, or any other system aspects that are not part of an object's interface. In so doing, the ORB provides interoperability between applications on different machines in heterogeneous distributed environments and seamlessly interconnects multiple object systems.

Referring to FIG. 1, network connection 17 provides the server 16 access to the TCP/IP network 14. Network connection 19 provides the client 18 access to the TCP/IP network 14. Network connection 21 provides the client 20 access to the TCP/IP network 14. Network connection 23 provides the client 22 access to the TCP/IP network 14. Network connection 25 provides the client 24 access to the TCP/IP network 14, and network connection 27 provides the ORB 26 access to the TCP/IP network 14.

The server 16 includes a software operating system loaded into the logic circuits of the server 16 that performs a series of steps to control the operations of the server 16. Server systems and subsystems incorporating features of the present invention can be implemented entirely in hardware, or in a combination of hardware and software (i.e. program modules stored in memory). For example, the server 16 includes Java applets but is not restricted to the Java applets that are programmed to the logic circuits to perform a series of steps dictated by the Java applets. Using the ORB 26, clients 18, 20, 22, and 24 obtain access to the server 16 for certain risk management analysis. The risk management analysis includes calculation of risks on portfolio positions for clients. Clients 18, 20, 22 and 24 are based on different hardware machines having logic circuits programmed to execute different operating systems. However, the ORB 26 in the CORBA environment provides an infrastructure for the distributed object-oriented system 10 that enables the clients 18, 20, 22, and 24 to interface with the server 16. Thus, clients having the ORB 26 infrastructure transparently communicate with the server 16 to service their requests for risk analysis.

In the CORBA environment, requests for risk analysis on portfolio positions for a client are transferred to the TCP/IP network 14. Client data for the risk analysis are also transferred to the TCP/IP network 14. The ORB 26 receives the requests for risk analysis and invokes the server 16 to service the requests from the clients. Server 16 performs risk analysis based on the client data transferred by the client. Once the risk analysis is complete, results of the risk analysis are transferred to the respective requesting clients.

Figure 2:
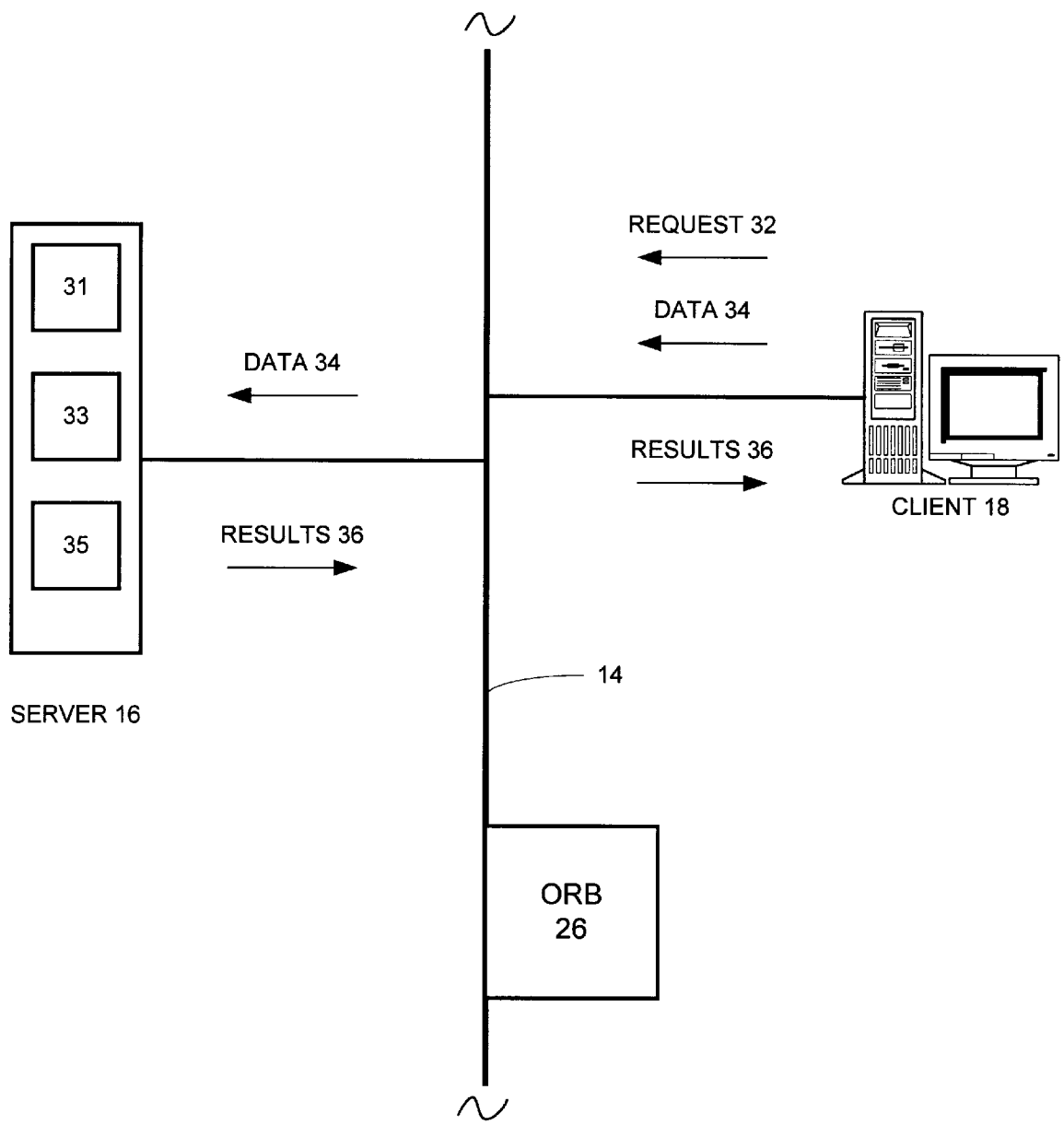
FIG. 2 illustrates a block diagram for processing a risk management request in the distributed object-oriented system in accordance with the present invention.

FIG. 2 illustrates a block diagram of a risk management analysis request from the client 18 to the server 16 operating in the CORBA environment. The client 18 transfers a risk management request 32 via the network connection 19 to request a risk analysis on portfolio positions to the TCP/IP network 14. Data 34 associated with the risk analysis on the portfolio positions are also transferred to the TCP/IP network 14 via the network connection 19. The ORB 26 intercepts the risk management object request 32 from the client 18 and directs the risk management request 32 to the server 16.

The server 16 includes a plurality of Java applets 31, 33, and 35. The ORB 26 directs the Java applet 35 to process the risk management object request 32. The Java applet 35 receives the data 34 via the network connection 17 coupled to the TCP/IP network 14 and calculates the risk results 36 on the portfolio positions from the data 34. The server 16 returns the risk results 36 via the network connection 17 to the TCP/IP network 14. The ORB 26 which resides on the TCP/IP network 14 retrieves the risk results 36 and transfers the risk results 36 to the requesting client 18 via the network connection 19.

Using the ORB infrastructure, a client requesting the risk analysis computations transfers a request and the associated data to the ORB. After the risk analysis computations are completed, the ORB directs the return of the results from the risk analysis to the client. Therefore, clients are isolated from the computational analytics of the risk analysis computations. Thus, the often proprietary analytical formulas are protected from the clients that request the analytic computations. Furthermore, localizing the Java applets on the server 16 affords dynamically configurable access to the Java applets. Java applets which reside on the server can be replaced with upgraded Java applets. Access resources of the server provide upgrades to the Java applets. The upgraded Java applets are accessible to the ORB and the clients of the distributed object-oriented system. Moreover, the access resources can dynamically configure the Java on the server based on the identity of a client making the request.

Figure 3:
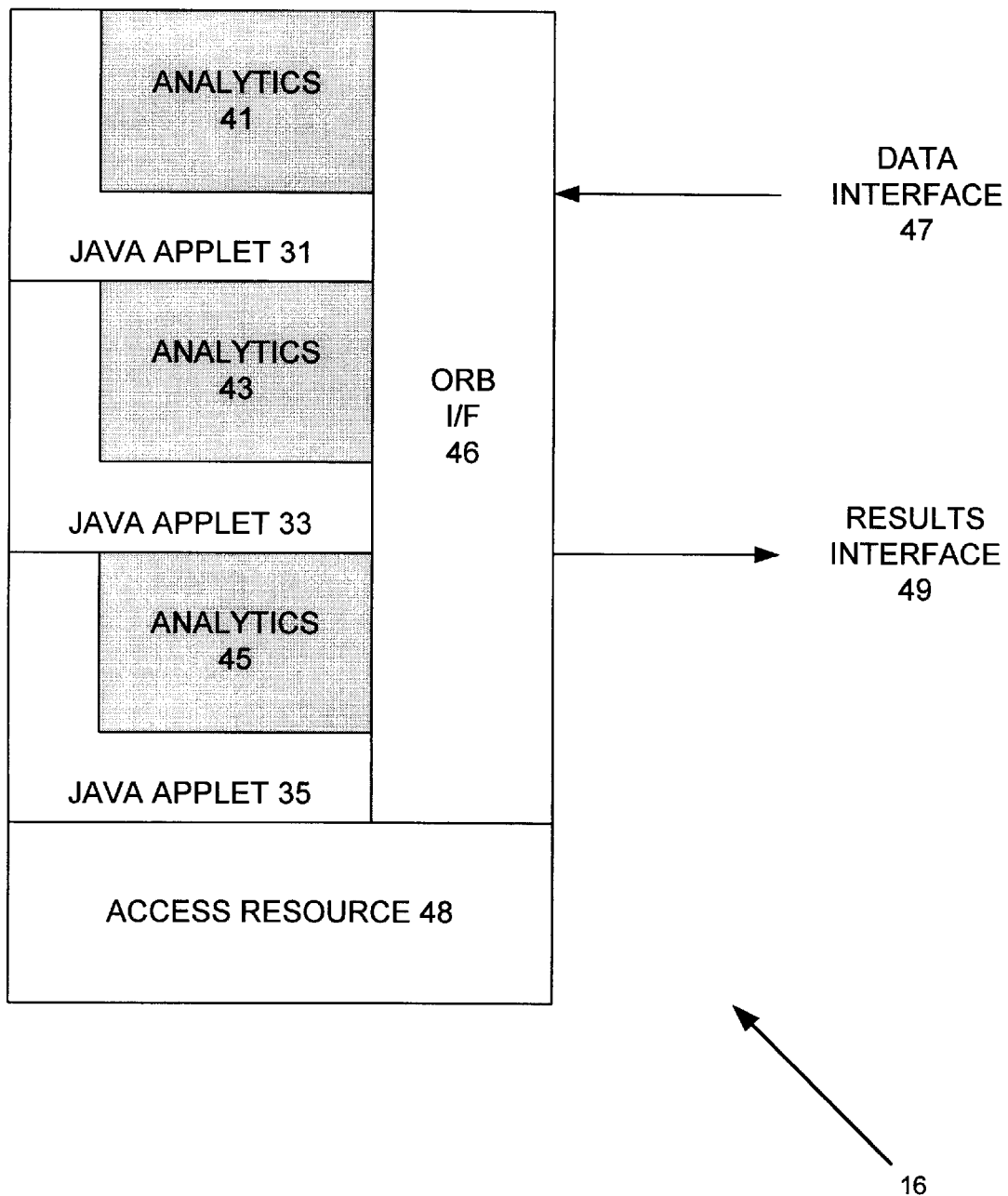
FIG. 3 illustrates a block diagram of a dynamic distributive desktop server in accordance with the present invention.

FIG. 3 illustrates a block diagram of the server 16 according to the present invention. The server 16 includes a Java applet 31, a Java applet 33, a Java applet 35, an ORB interface 46 and an access resource 48. The Java applet 31 includes analytics 41. The Java applet 33 includes analytics 43, and the Java applet 35 includes analytics 45. Each Java applet provides a particular analytical risk management function and is computer-readable code that when loaded into the logic circuits of the server 16, performs a series of specifically identified operations dictated by the Java applet. The analytics for the Java applets are proprietary. The ORB interface 46 provides an infrastructure for the server 16 to operate in the CORBA environment. The ORB interface 46 includes a data interface 47 and a result interface 49. Once a Java applet is directed to perform the computations for a risk management request, the Java applet receives the data 34 (FIG. 2) associated with the risk management request via the data interface 47. After the computations are complete, the results 36 of the risk management request are transferred to the results interface 49. The access resource 48 dynamically configures the Java applets to afford upgrades to the Java applets.

Transforming the analytics of risk management tools as coded Java applets affords fast distribution of the risk management tools without revealing the analytics for the risk management tools to the requesting clients. A requesting client supplies the data for the particular type of risk management analysis. Once the risk management analysis is complete, the risk results are returned to the requesting client. Furthermore, the requesting client receives the most recent versions of the analytics because the Java applets which reside on the server are accessible and are dynamically configured to provide the most up to date analytics.

While the foregoing detailed description has described several embodiments of the apparatus and methods for providing dynamic derivatives desktops in accordance with this invention, it is to be understood that the above description is illustrative only and not limiting of the disclosed invention. Obviously, many modifications and variations will be apparent to the practitioners skilled in this art. Accordingly, the apparatus and methods for providing dynamic derivatives desktops has been provided. The dynamic derivatives desktops afford fast distribution of risk management tools without revealing the analytics of the risk management tool to the requesting clients. Java applets encode the analytics of the risk management tools. Clients requesting a risk management analysis provide the input data associated with the risk analysis and receive result data from the analysis.

What is claimed is:

1. A dynamic derivatives desktop server in an object-oriented environment, the server comprising:
   an object-oriented interface configured to receive an analytic request from an end user client and return results of the analytic request through an object server, wherein the dynamic derivatives desktop server is unknown to the end user client;
   an applet depository coupled to the object-oriented interface having a plurality of dyamically modifiable applet resources to provide analytics for processing the analytic request while protecting computational analytics from the end user, wherein a first applet resource that processes the analytic request is maintained in the applet depository after completion of the processing; and
   access resources configured to receive a new applet resource for inclusion in the applet depository after receipt of a second analytic request;
   wherein the processing of the analytic request is initiated by the object server.

2. The dynamic derivatives desktop server according to claim 1, wherein the analytic request includes client data for the analytics.

3. The dynamic derivatives desktop server according to claim 1, wherein the analytics include derivatives analytics for risk management.

4. The dynamic derivatives desktop server according to claim 3, wherein the applets include Java applets.

5. A distributed object-oriented analytical risk management system on a TCP/IP network having an object-oriented request interface comprising:
   a client platform coupled to the TCP/IP network to provide a risk management request to the object-oriented request interface;
   a risk management server having analytics which receives the risk management request from the object-oriented request interface and calculates risk results in response to the risk management request; and
   an object broker configured to manage the object-oriented request interface, wherein the object broker receives the risk management request from the client platform, identifies one of a set of risk management servers for processing the risk management request, and forwards the risk management request to the risk management server;
   wherein the risk management server is unknown to the client platform.

6. The distributed object-oriented analytical risk management system according to claim 5, wherein:
   the risk management server provides the risk results to the object-oriented request interface; and
   the client platform receives the risk results from the object-oriented request interface through the object broker.

7. The distributed object-oriented analytical risk management system of claim 6, wherein the analytics are loaded onto the risk management server only after the risk management server receives the risk management request.

8. The distributed object-oriented analytical risk management system of claim 6, wherein the calculation of the risk results is initiated by a command from the object broker to the risk management server.

9. The distributed object-oriented analytical risk management system according to claim 7, wherein the risk management server includes a Java applet to provide the analytics to calculate the risk results for the client platform.

10. The distributed object-oriented analytical risk management system according to claim 8, wherein the risk management request includes client data to provide inputs for the analytics of the Java applet.

11. The distributed object-oriented analytical risk management system according to claim 9, wherein the risk management server includes access resources to dynamically configure operation of the Java applet based on an identity of a user operating the client platform.

12. A method of operating an analytical risk management tool in an object-oriented system having an object-oriented request interface comprising the steps:
   receiving a request for an analytical risk management calculation at a risk analysis server, said request being received from an object broker and originating from a client, wherein the risk analysis server is unknown to the client;
   receiving client data for the analytical risk management calculation;
   transferring the client data to a Java applet having analytics to perform the analytical risk management calculation, wherein the Java applet is dynamically upgradeable and is maintained on a permanent storage device;
   configuring the Java applet in accordance with an identity of the client,
   operating the Java applet to perform the analytical risk management calculation with the client data; and
   returning results of the risk management calculation to the object broker for return to the client.

13. The method of operating an analytical risk management tool according to claim 12 further comprising the step isolating the analytics from a client which requests the risk management calculation.

14. The method of operating an analytical risk management tool according to claim 12 further comprising the step configuring dynamically access to the Java applet in response to a particular client.

15. A risk analysis server, comprising:
   a first dynamically modifiable risk analysis module comprising computer executable instructions for evaluating a first risk request originating from a remote client computer;
   an object interface configured to receive said risk request from a remote intermediate server; and
   an access resource configured to receive a second risk analysis module;

wherein said first risk analysis module is executed to evaluate said first risk request and return results of said evaluation to said remote intermediate server; and wherein said first risk analysis module is retained on the risk analysis server after said execution.

16. The risk analysis server of claim 15, further comprising:

a second risk analysis module received and stored after receipt of a second risk request;

wherein said second risk request is evaluated by executing said second risk analysis module.

17. The risk analysis server of claim 15, wherein said execution of said first risk analysis module is initiated at the direction of said remote intermediate server.

18. The risk analysis server of claim 16, wherein said second risk analysis module replaces said first risk analysis module.

19. A system for receiving and analyzing a risk analysis request using a dynamically updateable risk analysis module, comprising:

a risk analysis server configured to receive risk analysis requests from a broker server, wherein said broker server receives each said risk analysis request from a client computer and determines whether said risk analysis server is capable of handling each said client risk analysis request;

a first dynamically updateable risk analysis module residing on said risk analysis server and comprising computer executable instructions configured to analyze a first risk analysis request received at said risk analysis server; and an access resource on said risk analysis server configured to receive a second dynamically updateable risk analysis module, wherein said second risk analysis module may augment or replace said first risk analysis module;

wherein one of said first risk analysis module and said second risk analysis module is executed to evaluate said first risk analysis request and return a result of said evaluation to said broker server.

20. The system of claim 19, wherein said first risk analysis request is received at said risk analysis server before either of said first risk analysis module and said second risk analysis module are received at said risk analysis server.

21. The system of claim 19, wherein said execution is triggered by said broker server.

22. A method of evaluating a client risk analysis request, comprising:

receiving at an object broker server a risk analysis request from a client computer, said risk analysis request comprising financial data of a user operating said client computer;

identifying a risk analysis server capable of servicing said risk analysis request;

receiving said risk analysis request at a first risk analysis server from said object broker;

receiving at said first risk analysis server a first risk analysis module comprising computer executable instructions;

storing said first risk analysis module on said first risk analysis server on a permanent storage device;

at the direction of said object broker server, executing said first risk analysis module on said first risk analysis server to evaluate said risk analysis request and generate results; and forwarding said results to said object broker server for return to said client computer.

23. The method of claim 22, further comprising customizing said execution of said first risk analysis module based on an identity of the user.

24. A method of satisfying a risk analysis request, comprising:

accepting a first risk analysis request at an intermediate server from a client computer;

receiving said first risk analysis request at a risk server from said intermediate server, wherein said risk server is unknown to said client computer;

examining said first risk analysis request on said risk server;

after said receiving and said examining, receiving a first risk analysis module at said risk server, wherein said first risk analysis module comprises a series of computer executable instructions configured to evaluate a risk analysis request;

executing said instructions to evaluate said first risk analysis request;

retaining said first risk analysis module after returning results of said execution to said intermediate server;

receiving a second risk analysis request at said risk server;

receiving a second risk analysis module at said risk server, with which to evaluate said second risk analysis request; and replacing said first risk analysis module with said second risk analysis module.

* * * * *

UNITED STATES PATENT AND TRADEMARK OFFICE
CERTIFICATE OF CORRECTION

PATENT NO. : 6,134,600
DATED : October 17, 2000
INVENTOR(S) : Liu

Page 1 of 1

It is certified that error appears in the above-identified patent and that said Letters Patent is hereby corrected as shown below:

<u>Claim 7, column 6,</u>
Line 9, replace "claim 6" with -- claim 5 --.

<u>Claim 8, column 6,</u>
Line 13, replace "claim 6" with -- claim 5 --.

<u>Claim 9, column 6,</u>
Line 17, replace "claim 7" with -- claim 6 --.

<u>Claim 10, column 6,</u>
Line 21, replace "claim 8" with -- claim 9 --.

<u>Claim 11, column 6,</u>
Line 25, replace "claim 9" with -- claim 10 --.

Signed and Sealed this

Eleventh Day of September, 2001

*Attest:*

*Attesting Officer*

NICHOLAS P. GODICI
*Acting Director of the United States Patent and Trademark Office*